Patented Dec. 1, 1942

2,303,708

UNITED STATES PATENT OFFICE 2,303,708

PRESERVATION OF RUBBER

Robert L. Sibley, Nitro, W. Va., assignor to Monsanto Chemical Company, St. Louis, Mo., a corporation of Delaware No Drawing. Application February 11, 1939, Serial No. 255,989

22 Claims. (Cl. 260—802)

The present invention relates to the art of rubber manufacture and particularly relates to rubber compositions which resist deterioration due to aging or to exposure to the atmosphere. It has long been known that such deterioration may be greatly retarded by treating the rubber before or after vulcanization with certain substances known as age-resistors or antioxidants. One object of this invention is to provide a superior class of antioxidants for rubber. A further object of this invention is to provide a class of materials which, when incorporated into rubber preferably before vulcanization thereof, impart thereto properties markedly resistant to tear and cracking when portions thereof have been repeatedly and alternately stretched and the tension removed. Such a process is analogous to the flexing of an automobile tire in actual road service.

The age-resisting characteristic of a vulcanized rubber product can be readily ascertained by subjecting samples of the vulcanized product to the action of air or oxygen under elevated pressure and at elevated temperature. The aged rubber samples are then examined and tested and the test data compared with the results obtained on testing the unaged rubber samples. The deterioration in properties as a result of the oxidation treatment is indicative of the result that would normally be expected of that particular stock during actual service. Such a test produces an effect on a vulcanized rubber stock comparable with that resulting from several years of natural aging of the rubber depending upon the conditions of the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391–394.

This invention comprises, more particularly, treating rubber with a product obtainable by heating a carboxylic acid together with a ketone-secondary aromatic amine condensation product. The nature of the change effected by heating the said ingredients together is not known but surprising improvements in properties are effected over the original ketone-secondary aromatic amines. The formation of carboxylic acid salts from ketone-secondary amines has been reported but the effect on the antioxidant properties is apparently only that of dilution of the original antioxidant and to obtain the increased effects exhibited by compounds of the present invention it is necessary to carry out the reactions at such a temperature that any salts formed at the outset are subsequently converted to the preferred class of materials. The particular temperature necessary, depends, of course, upon the specific reaction being carried out and this temperature is easily ascertained since the reactions are characterized by the separation of water from the reaction mixture. A convenient procedure is to mix directly the carboxylic acid with the ketone-secondary aromatic amine condensation product and gradually raise the temperature until the desired reaction begins. Water usually separates from the mass at about 140° C. and it is generally not necessary to heat above 175° C. These temperatures are in nowise critical but illustrate in a general way the temperatures within which the desired reactions may be expected to take place. As will be apparent from specific examples hereinafter given temperatures as low as 100° C. have been found satisfactory in certain instances and temperatures as high as 220° C. may be employed without deleterious effects.

A convenient means of following the reactions is to place the reacting ingredients into a suitable container fitted with a condenser which is in turn fitted with a receptacle adapted for the collection of water. The temperature in the reaction flask, when water first begins to distill, may be regarded as the beginning of the reaction, and this also gives an indication of the proper temperature for carrying out the reactions, which may be assumed to be essentially complete when water no longer distills at a temperature somewhat above that at which the reaction began. The reaction product may be employed directly to prevent the deterioration of rubber, or it may be further purified by any means conveniently adaptable to the chemical and physical properties of the product. Many variations in the manipulation and means of effecting the reactions may be introduced without departing from the spirit or scope of the present invention.

In order to illustrate more fully the preferred class of compounds, their preparation and their desirable preservative properties when incorporated into rubber, the following specific embodiments of the invention are given. They are to be understood as illustrative of the invention and not a limitation thereof.

A typical example of the preferred class of materials was prepared by heating the condensation product of diphenyl amine and acetone with oxalic acid. Substantially equimolecular proportions of the ketone-secondary aromatic amine condensation product and oxalic acid were placed in a suitable reactor and the mixture heated for three hours at 160-210° C. Water separated from the reaction mass and at the end of the heating period the residue remaining was a highly viscous oil with a greenish fluorescence. Its excellent antioxidant properties are hereinafter shown.

As a further specific example, the condensation product of substantially one molecular proportion of phenyl alpha naphthylamine and substantially one molecular proportion of acetone was heated with oxalic acid. The phenyl alpha naphthylamine-acetone condensation product was prepared by passing acetone vapor through phenyl alpha naphthylamine in the presence of a suitable catalyst as for example a small amount of iodine, at a temperature of 90-95° C. Substantially 63 parts by weight of the product so obtained (substantially 0.25 molecular proportion) and substantially 22 parts by weight of oxalic acid (substantially 0.25 molecular proportion) were heated at 160-220° C. for 4 hours at which time water had ceased to be evolved from the reaction. The residue was digested with a mixture of water and benzene to remove any unreacted oxalic acid or other acid constituents formed in situ, the desired reaction product dissolving in the benzene layer. The product obtained after removal of the benzene, comprising the preferred antioxidant, was a dark colored solid melting at about 60° C.

In another example the condensation product of substantially one molecular proportion of phenyl beta naphthylamine and substantially one cellent antioxidant properties are hereinafter shown.

As exemplary of the use of other carboxylic acid, substantially one molecular proportion of the condensation product of phenyl beta naphthylamine and acetone, obtained as described in the foregoing example, was heated with formic acid employing an excess of substantially 10% over one molecular proportion of 90% formic acid. The heating was carried out at substantially 100° C. for twelve hours after which the product was digested with a water-benzene mixture as previously described. After removal of the solvent the desired product was obtained as a low melting solid.

In a further example di beta naphthylamine was condensed with methyl ethyl ketone by heating the reacting ingredients in the presence of a suitable catalyst to substantially refluxing temperature, which temperature was maintained for forty hours. Unreacted ingredients were removed and the product so obtained was heated with oxalic acid substantially as described in the foregoing examples.

As specific embodiments of the invention, the products described in the foregoing examples were incorporated into typical rubber stocks where they exhibited the highly desirable properties characteristic of the preferred class of materials. To exemplify the improvements effected over the untreated ketone-secondary aromatic amine condensation products, typical examples of the untreated materials were incorporated into rubber stocks which were treated and tested in the same manner. Thus, rubber stocks were compounded comprising

|  | Stock | | | | | | | |
| --- | --- | --- | --- | --- | --- | --- | --- | --- |
|  | A | B | C | D | E | F | G | H |
|  | Parts by weight | Parts by weight | Parts by weight | Parts by weight | Parts by weight | Parts by weight | Parts by weight | Parts by weight |
| Smoked sheets of rubber | 100. | 100. | 100. | 100. | 100. | 100. | 100. | 100. |
| Carbon black | 50. | 50. | 50. | 50. | 50. | 50. | 50. | 50. |
| Zinc Oxide | 5. | 5. | 5. | 5. | 5. | 5. | 5. | 5. |
| Sulfur | 3. | 3. | 3. | 3. | 3. | 3. | 3. | 3. |
| Pine tar | 2. | 2. | 2. | 2. | 2. | 2. | 2. | 2. |
| Stearic Acid | 3. | 3. | 3. | 3. | 3. | 3. | 3. | 3. |
| Benzothiazyl thiobenzoate | 0.8 | 0.8 | 0.8 | 0.8 | 0.8 | 0.8 | 0.8 | 0.8 |
| Diphenyl guanidine | 0.2 | 0.2 | 0.2 | 0.2 | 0.2 | 0.2 | 0.2 | 0.2 |
| Condensation product of di (beta napthyl) amine and methyl ethyl ketone | 1. |  |  |  |  |  |  |  |
| Condensation product of di (beta napthyl) amine and methyl ethyl ketone heated with oxalic acid |  | 1. |  |  |  |  |  |  |
| Condensation product of phenyl alpha napthylamine and acetone |  |  | 1. |  |  |  |  |  |
| Condensation product of phenyl alpha napthylamine and acetone heated with oxalic acid |  |  |  | 1. |  |  |  |  |
| Condensation product of phenyl beta naphthylamine and acetone heated with oxalic acid |  |  |  |  | 1. |  |  |  |
| Condensation product of phenyl beta naphthylamine and acetone heated with formic acid |  |  |  |  |  | 1. |  |  |
| Condensation product of diphenyl amine and acetone |  |  |  |  |  |  | 1. |  |
| Condensation product of diphenyl amine, and acetone heated with oxalic acid |  |  |  |  |  |  |  | 1. | molecular proportion of acetone was prepared by passing acetone vapor through phenyl beta naphthylamine in the presence of a suitable catalyst and at a temperature of 130-140° C. Substantially equi-molecular proportions of the product so obtained and anhydrous oxalic acid were heated together substantially as described in the foregoing example to produce another example of the preferred class of materials. Its ex- The rubber stocks so compounded were vulcanized in a press at the temperature of 30 pounds steam pressure per square inch and portions of the vulcanized products were then artificially aged by heating in a bomb at a temperature of 70° C. and under a pressure of 300 pounds of oxygen per square inch. The results obtained upon testing the aged and unaged cured rubber products is given in Table I.

*Table I*

| Stock | Cure time in min. | Hrs. aged | Modulus of elasticity in lbs./in.² at elongations of— | | Tensile at break in lbs./in.² | Ult. elong. per cent |
|---|---|---|---|---|---|---|
| | | | 200% | 400% | | |
| A | 60 | 0 | 1080 | 2960 | 4375 | 580 |
| B | 60 | 0 | 1090 | 2980 | 4470 | 525 |
| A | 60 | 96 | 990 | | 1810 | 390 |
| B | 60 | 96 | 1010 | 2000 | 2000 | 400 |
| A | 60 | 120 | 665 | | 930 | 330 |
| B | 60 | 120 | 770 | | 1335 | 370 |
| A | 75 | 0 | 1180 | 3100 | 4450 | 565 |
| B | 75 | 0 | 1200 | 3110 | 4400 | 560 |
| A | 75 | 96 | 1030 | | 1840 | 380 |
| B | 75 | 96 | 1140 | | 2235 | 395 |
| A | 75 | 120 | 675 | | 855 | 300 |
| B | 75 | 120 | 810 | | 1265 | 335 |
| A | 90 | 0 | 1240 | 3320 | 4590 | 560 |
| B | 90 | 0 | 1210 | 3195 | 4450 | 540 |
| A | 90 | 96 | 1120 | | 1600 | 330 |
| B | 90 | 96 | 1210 | | 2135 | 365 |
| A | 90 | 120 | 540 | | 585 | 285 |
| B | 90 | 120 | 765 | | 1000 | 305 |
| C | 60 | 0 | 970 | 2800 | 4450 | 585 |
| D | 60 | 0 | 940 | 2760 | 4600 | 605 |
| E | 60 | 0 | 1080 | 3040 | 4345 | 550 |
| F | 60 | 0 | 1000 | 2810 | 4520 | 595 |
| C | 60 | 96 | 840 | | 1460 | 360 |
| D | 60 | 96 | 850 | 1740 | 1740 | 400 |
| E | 60 | 96 | 1140 | 2280 | 2280 | 400 |
| F | 60 | 96 | 955 | 2140 | 2460 | 490 |
| C | 60 | 120 | 685 | | 1100 | 350 |
| D | 60 | 120 | 720 | | 1220 | 350 |
| E | 60 | 120 | 895 | | 1560 | 390 |
| F | 60 | 120 | 810 | 1625 | 1625 | 400 |
| C | 75 | 0 | 1040 | 2780 | 4450 | 585 |
| D | 75 | 0 | 965 | 2800 | 4525 | 600 |
| E | 75 | 0 | 1210 | 3180 | 4425 | 545 |
| F | 75 | 0 | 1060 | 3010 | 4500 | 560 |
| C | 75 | 96 | 850 | | 1425 | 365 |
| D | 75 | 96 | 895 | | 1600 | 370 |
| E | 75 | 96 | 1150 | 2350 | 2380 | 400 |
| F | 75 | 96 | 1110 | 2360 | 2360 | 400 |
| C | 75 | 120 | 735 | | 1080 | 315 |
| D | 75 | 120 | 810 | | 1160 | 320 |
| E | 75 | 120 | 885 | | 1430 | 340 |
| F | 75 | 120 | 875 | | 1600 | 380 |
| C | 90 | 0 | 1080 | 3080 | 4600 | 560 |
| D | 90 | 0 | 1135 | 3060 | 4530 | 580 |
| E | 90 | 0 | 1240 | 3240 | 4450 | 535 |
| F | 90 | 0 | 1270 | 3155 | 4550 | 540 |
| C | 90 | 96 | 925 | | 1390 | 365 |
| D | 90 | 96 | 935 | | 1520 | 350 |
| E | 90 | 96 | 1260 | | 2240 | 370 |
| F | 90 | 96 | 1160 | 2480 | 2480 | 400 |
| C | 90 | 120 | 820 | | 1045 | 315 |
| D | 90 | 120 | 830 | | 1305 | 360 |
| E | 90 | 120 | 840 | | 1200 | 330 |
| F | 90 | 120 | 800 | | 1270 | 350 |
| G | 60 | 0 | 1110 | 3000 | 4250 | 565 |
| H | 60 | 0 | 1080 | 2900 | 4275 | 560 |
| G | 60 | 120 | 885 | 1840 | 1840 | 400 |
| H | 60 | 120 | 960 | 2050 | 2050 | 400 |
| G | 75 | 0 | 1200 | 3125 | 4275 | 540 |
| H | 75 | 0 | 1230 | 3130 | 4175 | 535 |
| G | 75 | 120 | 1010 | | 1855 | 380 |
| H | 75 | 120 | 1005 | | 2050 | 380 |
| G | 90 | 0 | 1210 | 3170 | 4250 | 535 |
| H | 90 | 0 | 1230 | 3180 | 4200 | 530 |
| G | 90 | 120 | 1075 | | 1670 | 315 |
| H | 90 | 120 | 1030 | | 1900 | 345 |

The data set forth above show the typical desirable aging qualities of the preferred class of materials. They further show the marked improvement in aging properties exhibited by the preferred class of materials over the untreated ketone-secondary aromatic amine condensation products.

In addition the above described rubber stocks were tested on a flexing machine in the manner hereinbefore set forth and found to be markedly superior in flex cracking resistance to a stock containing none of the preferred materials. Moreover, it was found that in general the preferred materials which were so tested provided, when incorporated into rubber, rubber products showing flex cracking resistance superior to that of rubber products containing antioxidants commonly employed commercially. Thus, the incorporation of the preferred materials into rubber frequently resulted in flex cracking resistance superior to that obtained by the use of the ketone-secondary aromatic amine condensation products employed in their preparation.

A wide variety of ketone-secondary aromatic amine products may be employed in the preparation of the preferred class of materials. For example, the products produced by reacting other proportions of ketone and secondary aromatic amine, than those specifically mentioned, may be employed in the preparation of the preferred class of materials for, in the present invention ketone-secondary aromatic amine products produced in any and all proportions are applicable. Ketone-secondary aromatic amines make up a well known class of products, and reference must largely be had to the chemical literature for details of their preparation and properties; for example, see United States Patent 1,807,355 to William P. ter Horst. The reactions are usually carried out in the presence of a condensation catalyst such as iodine, bromine, sulfuric acid, benzene sulfonic acid and the like. Where desired the reactions may be carried out under elevated pressures or under atmospheric pressure by passing acetone vapor into the hot secondary aromatic amine. This invention does not relate to the preparation or use of ketone-secondary amines per se nor is it limited thereto. Neither is this invention limited to the particular ketone-secondary aromatic amines mentioned in the examples describing the preparation of the preferred class of materials, nor to these mentioned below. As further typical examples may be mentioned acetone-dinaphthyl amine, acetone-di (biphenyl) amine, acetone-monoethyl aniline, mesityl oxide-phenyl alpha naphthylamine, diacetone alcohol-phenyl beta naphthylamine, methyl ethyl ketone-diphenyl-p-phenylene diamine, and acetone diphenyl beta naphthyl amine.

Ketone-secondary aromatic amines such as illustrated above may be reacted with other carboxylic acids than those specifically mentioned in the examples. For example in addition to formic and oxalic acid there may be employed malonic acid, succinic acid, propionic acid, lactic acid, glycollic acid, glutaric acid, acetic acid and equivalents and analogues thereof.

A number of specific embodiments of the invention have been hereinbefore given illustrating the preparation and desirable properties of the new and preferred class of antioxidants, and it has been thereby shown that a class of materials comprising broadly the products produced by the action of carboxylic acids on ketone-secondary aromatic amines possess useful properties. It is apparent to anyone skilled in the art to which the present invention pertains that a wide variety of methods of manipulations and conditions may be adapted to the preparation of the preferred class of materials. For example solvents may be employed.

It is obvious that practice of the present invention is not limited to the specific compositions given above, such compositions being merely illustrative of the manner of employing the antioxidants or age-resistors of the invention. The antioxidants or age-resistors may be employed in different proportions than herein described and in conjunction with other vulcanizing agents than those specifically disclosed, for this invention is applicable generally to pure rubber or rubber compositions of the most varied sort. Furthermore, the preferred class of materials may be employed in conjunction with other accelerators than those specifically shown, with varying degrees in tensile and modulus properties but still exhibiting the desirable properties of the class.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is employed in the claims to define a vulcanizable plastic material which possesses high extensibility under load coupled with the property of forcibly retracting to approximately its original size and shape after the load is removed. Such products include, for example, india rubber, reclaimed rubber, balata, gutta percha and other natural or synthetic vulcanizable products which deteriorate upon aging whether or not admixed with fillers, pigments or accelerating agents.

The present invention is limited solely by the claims attached hereto as part of the present specification.

What is claimed is:

1. The method of preserving a rubber which comprises treating a rubber with a product obtained by heating an aliphatic carboxylic acid containing at least two carbon atoms with a condensation product of a ketone and a secondary aromatic amine in an amount at least sufficient to combine with the basic constituents of the ketone-amine at such a temperature that water is removed from the reaction mixture in substantial excess of any free or combined water present as such.

2. The method of preserving a rubber which comprises treating a rubber with a product obtained by heating an aliphatic carboxylic acid containing at least two carbon atoms with a condensation product of an aliphatic ketone and a secondary aromatic amine in an amount at least sufficient to combine with the basic constituents of the ketone-amine at such a temperature that water is removed from the reaction mixture in substantial excess of any free or combined water present as such.

3. The method of preserving a rubber which comprises treating a rubber with a product obtained by heating a dibasic aliphatic carboxylic acid with a condensation product of an aliphatic ketone and a secondary aromatic amine in substantially equi-molecular proportions and at such a temperature that water is removed from the reaction mixture in substantial excess of any free or combined water present as such.

4. The method of preserving a rubber which comprises treating a rubber with a product obtained by heating a dibasic aliphatic carboxylic acid with a condensation product of acetone and a secondary aromatic amine in an amount at least sufficient to combine with the basic constituents of the ketone-amine at such a temperature that water is removed from the reaction mixture in substantial excess of any free or combined water present as such.

5. The method of preserving a rubber which comprises treating a rubber with a product obtained by heating oxalic acid with a condensation product of an aliphatic ketone and a secondary aromatic amine in an amount at least sufficient to combine with the basic constituents of the ketone-amine and at a temperature within the range of 140–220° C.

6. The method of preserving india rubber which comprises treating india rubber with a product obtained by heating oxalic acid with a condensation product of acetone and a secondary aromatic amine in substantially equi-molecular proportions and at such a temperature that water is removed from the reaction mixture in substantial excess of any free or combined water present as such.

7. The method of preserving a rubber which comprises treating a rubber with a product obtained by heating oxalic acid with the condensation product of acetone and diphenyl amine in substantially equi-molecular proportions and at such a temperature that water is removed from the reaction mixture in substantial excess of any free or combined water present as such.

8. The method of preserving a rubber which comprises treating a rubber with a product obtained by heating oxalic acid with the condensation product of acetone and di-beta-naphthyl amine in substantially equi-molecular proportions and at such a temperature that water is removed from the reaction mixture in substantial excess of any free or combined water present as such.

9. The method of preserving a rubber which comprises treating a rubber with a product obtained by heating oxalic acid with the condensation product of acetone and phenyl-beta-naphthylamine in substantially equi-molecular proportions and at such a temperature that water is removed from the reaction mixture in substantial excess of any free or combined water present as such.

10. The composition comprising a rubber, sulfur and a product obtained by heating an aliphatic carboxylic acid containing at least two carbon atoms with a condensation product of a ketone and a secondary aromatic amine in an amount at least sufficient to combine with the basic constituents of the ketone-amine at such a temperature that water is removed from the reaction mixture in substantial excess of any free or combined water present as such.

11. The composition comprising a rubber, sulfur and a product obtained by heating an aliphatic carboxylic acid containing at least two carbon atoms with a condensation product of an aliphatic ketone and a secondary aromatic amine in an amount at least sufficient to combine with the basic constituents of the ketone-amine at such a temperature that water is removed from the reaction mixture in substantial excess of any free or combined water present as such.

12. The composition comprising a rubber, sulfur and a product obtained by heating a dibasic aliphatic carboxylic acid with a condensation pjroduct of an aliphatic ketone and a secondary aromatic amine in substantially equi-molecular proportions and at such a temperature that water is removed from the reaction mixture in substantial excess of any free or combined water present as such.

13. The composition comprising a rubber, sulfur and a product obtained by heating a dibasic aliphatic carboxylic acid with a condensation product of acetone and a secondary aromatic amine in an amount at least sufficient to combine with the basic constituents of the ketone-amine at such a temperature that water is removed from the reaction mixture in substantial excess of any free or combined water present as such.

14. The composition comprising a rubber, sulfur and a product obtained by heating oxalic acid with a condensation product of an aliphatic ketone and a secondary aromatic amine in an amount at least sufficient to combine with the basic constituents of the ketone-amine and at a temperature within the range of 140–220° C.

15. The composition comprising india rubber, sulfur and a product obtained by heating oxalic acid with a condensation product of acetone and a secondary aromatic amine in substantially equi-molecular proportions and at such a temperature that water is removed from the reaction mixture in substantial excess of any free or combined water present as such.

16. The composition comprising a rubber, sulfur and a product obtained by heating oxalic acid with the condensation product of acetone and diphenyl amine in substantially equi-molecular proportions and at such a temperature that water is removed from the reaction mixture in substantial excess of any free or combined water present as such.

17. The composition comprising a rubber, sulfur and a product obtained by heating oxalic acid with the condensation product of acetone and di-beta-naphthyl amine in substantially equi-molecular proportions and at such a temperature that water is removed from the reaction mixture in substantial excess of any free or combined water present as such.

18. The composition comprising a rubber, sulful and a product obtained by heating oxalic acid with the condensation product of acetone and phenyl-beta-naphthylamine in subtsantially equi-molecular proportions and at such a temperature that water is removed from the reaction mixture in substantial excess of any free or combined water present as such.

19. The method of preserving india rubber which comprises treating india rubber with a product obtained by heating an aliphatic carboxylic acid containing at least two carbon atoms with a condensation product of a ketone and a secondary aromatic amine in an amount at least sufficient to combine with the basic substituents of the ketone-amine and at a temperature within the range of 140-220° C.

20. The method of preserving india rubber which comprises treating india rubber with a product obtained by heating a dibasic aliphatic carboxylic acid with a condensation product of an aliphatic ketone and a secondary aromatic amine in an amount at least sufficient to combine with the basic substituents of the ketone-amine and at such a temperature that water is removed from the reaction mixture in substantial excess of any free or combined water present as such.

21. The composition comprising india rubber, sulfur and a product obtained by heating an aliphatic carboxylic acid containing at least two carbon atoms with a condensation product of a ketone and a secondary aromatic amine in an amount at least sufficient to combine with the basic substituents of the ketone-amine and at a temperature within the range of 140–220° C.

22. The composition comprising india rubber, sulfur and a product obtained by heating a dibasic aliphatic carboxylic acid with a condensation product of an aliphatic ketone and a secondary aromatic amine in an amount at least sufficient to combine with the basic substituents of the ketone-amine and at a temperature within the range of 140-220° C.

ROBERT L. SIBLEY.

CERTIFICATE OF CORRECTION.

Patent No. 2,303,708.　　　　　　　　　　　　　December 1, 1942.

ROBERT L. SIBLEY.

It is hereby certified that error appears in the printed specification of the above numbered patent requiring correction as follows: Page 5, second column, lines 34 and 35, claim 22, for "at a temperature within the range of 140-220° C." read --at such a temperature that water is removed from the reaction mixture in substantial excess of any free or combined water present as such--; and that the said Letters Patent should be read with this correction therein that the same may conform to the record of the case in the Patent Office.

Signed and sealed this 26th day of January, A. D. 1943.

(Seal)　　　　　　　　　　　　　　　　　　Henry Van Arsdale,
　　　　　　　　　　　　　　　　　　Acting Commissioner of Patents.